United States Patent
Raju

(10) Patent No.: US 10,116,190 B2
(45) Date of Patent: Oct. 30, 2018

(54) ROTARY POSITIONING SYSTEM

(71) Applicant: Systemantics India Pvt. Ltd., Bangalore (IN)

(72) Inventor: Jagannath Raju, Bangalore (IN)

(73) Assignee: Systemantics India PVT. Ltd., Bangalore (IN)

( * ) Notice: Subject to any disclaimer, the term of this patent is extended or adjusted under 35 U.S.C. 154(b) by 0 days.

(21) Appl. No.: 15/064,746

(22) Filed: Mar. 9, 2016

(65) Prior Publication Data
US 2017/0194841 A1    Jul. 6, 2017

(30) Foreign Application Priority Data
Jan. 5, 2016    (IN) .............................. 201641000246

(51) Int. Cl.
*H02K 11/21* (2016.01)
*G05B 19/31* (2006.01)
*H02K 7/116* (2006.01)

(52) U.S. Cl.
CPC ............. *H02K 11/21* (2016.01); *G05B 19/31* (2013.01); *H02K 7/116* (2013.01); *G05B 2219/35457* (2013.01)

(58) Field of Classification Search
CPC ...... G05B 19/232; G05B 19/40; G05B 19/23; G05B 19/231; G05B 19/39
USPC ........................................................ 318/603
See application file for complete search history.

(56) References Cited

U.S. PATENT DOCUMENTS

| | | | | |
|---|---|---|---|---|
| 7,426,978 B2* | 9/2008 | Onizuka | ............. | B62D 5/0409 180/444 |
| 2002/0050756 A1* | 5/2002 | Ito | ........................ | H02K 11/215 310/135 |
| 2012/0210791 A1* | 8/2012 | Pannek | .................... | B62D 6/10 73/514.02 |
| 2014/0084840 A1* | 3/2014 | Osaka | .................. | G05B 19/404 318/632 |

FOREIGN PATENT DOCUMENTS

JP    2010238174 A    * 10/2010

OTHER PUBLICATIONS

Machine Translation for JP 2010238174 A.*

* cited by examiner

*Primary Examiner* — Kawing Chan
*Assistant Examiner* — Bradley Brown
(74) *Attorney, Agent, or Firm* — Harness, Dickey & Pierce, P.L.C.

(57) ABSTRACT

A rotary positioning system configured to provide absolute referencing is provided. The rotary positioning system includes an encoder mounted on a motor shaft of a motor and configured to generate an index pulse corresponding to a complete rotation of the motor shaft. The rotary positioning system also includes a speed reducer coupled to the motor shaft and configured to reduce a rotary motion of the motor by a pre-defined ratio and an output drive shaft coupled to the speed reducer and configured to transfer the reduced rotary motion to a load. The rotary positioning system further includes a sensor mounted on the output drive shaft of the speed reducer and configured to determine an absolute orientation of the output drive shaft and a controller coupled to the sensor and configured to generate a correlation function of the absolute orientation and the index pulse count.

18 Claims, 3 Drawing Sheets

ROTARY POSITIONING SYSTEM

PRIORITY STATEMENT

The present application hereby claims priority under 35 U.S.C. § 119 to Indian patent application number 201641000246 filed 5 Jan. 2016, the entire contents of which are hereby incorporated herein by reference.

BACKGROUND

The invention relates generally to rotary positioning systems and more particularly to a system and method to provide absolute referencing in rotary positioning systems.

Typically, a rotary positioning unit includes a motor (e.g. electric, hydraulic etc.) and a speed reducer whose input is driven by the motor and whose output delivers a rotary motion to a load. Here, an angular position of the output drive shaft is measured using a rotary encoder placed on the motor shaft or at the output of the speed reducer, or both. In particular, the angular position measurements are obtained using a relatively low-cost incremental encoder or a high-cost multi-turn absolute encoder on the motor shaft, or a very high-cost high resolution absolute encoder at the output shaft.

However, the incremental encoders have to be referenced every time on power-up. This process of providing a repeatable reference is generally referred to as "Mastering". Also, mastering requires the output drive shaft of the rotary drive to be programmatically rotated to an electronic limit switch at one end of its motion range and the sensing of the limit provides a reference signal for initializing the encoder count to a user-programmable value. This process becomes problematic when there are multiple rotary positioning units in a system and even more so when they are inter-dependent (For example, as in a robotic arm). In some cases, mastering becomes tedious when the output drive shaft referencing limit switch is outside the range of operation.

Currently, these drawbacks are addressed using expensive multi-turn but low-resolution absolute encoders on the motor shaft or even more expensive single-turn high resolution absolute encoders at the output drive shaft of the speed reducer, or by providing a battery backed-up non-volatile storage of the angular position measurement from the incremental encoder. However, the resolution of absolute encoders when mounted at the joint output drive shaft has to be relatively high for precision motion applications (typically of the order of 24 bits or more for one single turn of the output drive shaft). Also, single turn absolute encoders are relatively inexpensive for a small number of bits (8 or so) but climb rapidly in cost and size as they provide from 16 to 30 bits.

Moreover, battery backed up non-volatile storage solutions require monitoring of battery life and periodic battery replacement and cannot address scenarios in which the rotary positioning unit is disturbed manually or otherwise during the power loss period. In such a scenario the stored angular position measurement does not account for the disturbance.

Therefore, there is a need for a cost effective system for mastering of the rotary positioning unit.

SUMMARY

Briefly, according to one aspect of the invention, a rotary positioning system configured to provide absolute referencing is provided. The rotary positioning system includes an encoder mounted on a motor shaft of a motor and configured to generate an index pulse corresponding to one complete rotation of the motor shaft. The rotary positioning system also includes a speed reducer coupled to the motor shaft and configured to reduce a rotary motion of the motor by a pre-defined ratio and an output drive shaft coupled to the speed reducer and configured to transfer the reduced rotary motion to a load. The rotary positioning system further includes a sensor mounted on the output drive shaft of the speed reducer and configured to determine an absolute orientation of the output drive shaft and a controller coupled to the sensor and configured to generate a correlation function of the absolute orientation and the index pulse count.

DRAWINGS

DETAILED DESCRIPTION

The present invention provides a rotary positioning system. The rotary positioning system of the invention is based on the use of widely available, inexpensive, low resolution, miniature, rugged, solid state sensors with no external moving parts mounted on the output drive shaft (or any mechanical structure coupled to it). The rotary positioning system is described below with example embodiments and drawings. References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
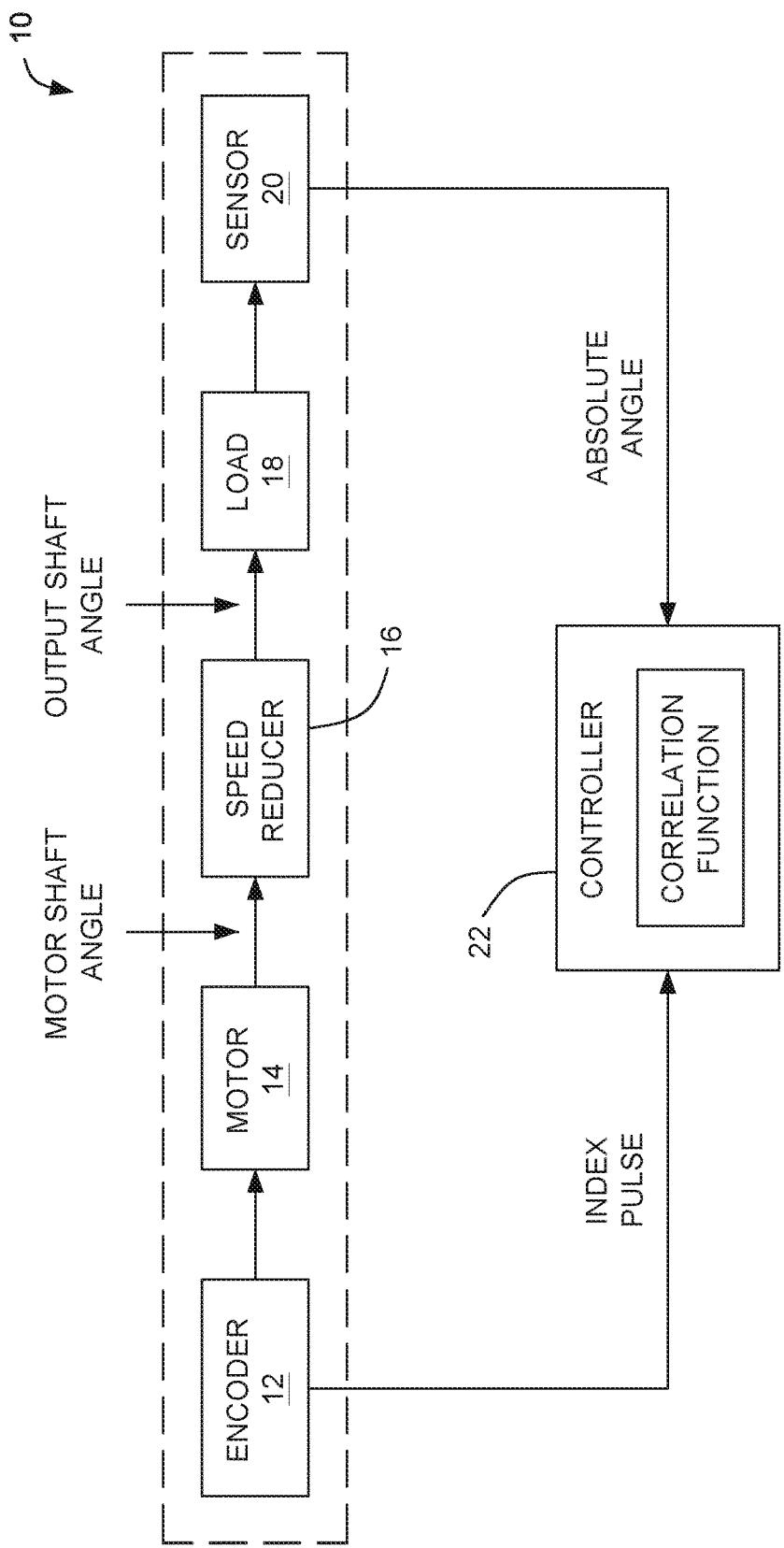
FIG. 1 is a block diagram of one embodiment of a rotary positioning system, implemented according to aspects of the present technique.

FIG. 1 is a block diagram of one embodiment of a rotary positioning system, implemented according to aspects of the present technique. The system 10 includes an encoder 12, a motor 14, and a speed reducer 16. The system 10 further includes a load 18, a sensor 20 and a controller 22. Each component is described in further details below.

Encoder 12 is mounted on a motor shaft 24 of the motor 14 and is configured to generate an index pulse corresponding to a complete rotation of the motor shaft 24. The encoder 12 is a electromechanical device used for sensing in several applications like on motors paired with drives and automated machinery for everything from consumer electronics, elevators, and conveyor speed monitoring to position control on automated industrial machines and robotics. The encoder 12 tracks the turning of the motor shaft 24 to generate digital position and motion information. In one embodiment, the encoder 12 is configured to operate on absolute values or incremental values. Typically, the output of encoders indicates the current position of the motor shafts, making them angle transducers.

For industrial applications, incremental encoders are used when relative motor or output shaft position is needed or cost is an issue. In contrast, absolute encoders (which give a different binary output at each position, so shaft position is absolutely determined) are used when cost is not a constraint or when absolute motor or output shaft position is needed. For incremental encoders, resolution is defined as counts per turn. A 12-bit encoder has a resolution of 4,096 counts. For absolute single-turn encoders, the shaft position is directly accessed as a multi-bit word. For multi-turn absolute encoders (those that track over multiple 360° turns) the number of turns is also integrated into the multi-bit word.

In one embodiment, the incremental encoder 12 provides three channels referred to as A, B and Z. The Z channel is the index pulse that occurs once for one complete 360 degree rotation of the motor shaft 24.

Motor 14 includes a rotor and a stator and is configured to drive the load 18. Preferably, the stator is attached to the fixed portion, while the rotor is attached to the movable portion. Examples of the motor 14 may include, but are not limited to, continuous motor, stepper motor, servo motor and the like. While most electric motor applications involve continuous rotation of the motor shaft when an electric current is applied, some applications require precise control of the angle of an output drive shaft in response to an angular position command. For example, one important application is driving a valve spool in electro-hydraulic and electro-pneumatic servo-valves. Additional applications include positioning a robotic arm, positioning an actuator for a computer disk drive, or even moving the air modulation device in a low frequency loud speaker.

Speed reducer 16 is coupled to the motor shaft 24 and is configured to reduce the rotary motion of the motor 14 by a pre-defined ratio required to drive the load 18. In one example embodiment, speed reducer 16 may include a gear or series of gears. In this example embodiment, the value of the output rotary motion is achieved by reducing the speed input rotation by a ratio of "1/X." In this case, "X" represents the reduction ratio. The variable "X" is then multiplied against the rotary motion of the unreduced motor. This gives the rotary motion of the motor 14 after a speed reducer 16 has been applied to it. This rotary motion can then be applied to drive whatever load it is intended for. Examples of speed reducer 16 include, but are not limited to, spur gear train, planetary gear train, harmonic speed reducer, worm speed reducer etc.

Speed reducers are used in several industries that employ hydraulic or electric machinery. Some examples of uses of speed reducers are in running conveyor belts, medical machines, food processors, printing devices, computers, automotive engines and construction-related machinery. The type used is dependent on the type of motor.

In one embodiment, the output drive shaft 26 is coupled to the speed reducer 16 and is configured to transfer the reduced rotary motion to the load 18. Examples of the load 18 may include, but are not limited to, machine tool motion axes, robotic arm joints and the like.

Sensor 20 is mounted on the output drive shaft 26 of the motor 14 and is configured to determine an absolute orientation of the output drive shaft 26 for every index pulse generated. In one embodiment, the sensor 20 is further configured to determine an absolute orientation of the output drive shaft 26 using a combination of one or more of acceleration, angular velocity and magnetic field.

In one embodiment, the sensor 20 includes a motion sensor or an orientation sensor based on the magnetic field or the acceleration from the gravity field. After mounting the sensor 20 on the output drive shaft 26, a one-time calibration is done which references the absolute orientation from the sensor 20 to the occurrences of the index pulses. In one example embodiment, the one-time calibration is performed by rotating the output drive shaft 26 from a predefined range limit towards an opposite predefined range limit marked by a limit switch. During this motion, the sensor 20 readings are recorded on every Z index channel pulse.

Controller 22 is coupled to the sensor 20 and is configured to generate a correlation function of the absolute orientation and the index pulse count. In one example embodiment, controller 22 includes an arithmetic unit, such as a central processing unit, a memory unit comprising of several different types of memories, and an index pulse counting unit that comprises a counter circuit or the like. In this example embodiment, controller 22 performs an operation of angle measurement of the output drive shaft 26. The arithmetic unit performs arithmetic processing for calculating the angle of output drive shaft 26. The memory unit stores the value representing the relation between the index pulse count from the encoder 12 and the angle of output drive shaft 26. Examples of the controller 22 may include, but are not limited to, digital signal processors, micro-controllers, application specific integrated circuits (ASICs) and the like.

In one embodiment, the controller 22 is further configured to determine an index pulse count corresponding to the absolute orientation by using the correlation function and to preload a position counter with a corresponding joint angle value from the correlation function. In another embodiment, the controller 22 further includes a non-volatile memory configured to store the correlation function of the absolute orientation angle and the index pulse count. This joint angle value is then used as an input to drive the load 18.

Figure 2:
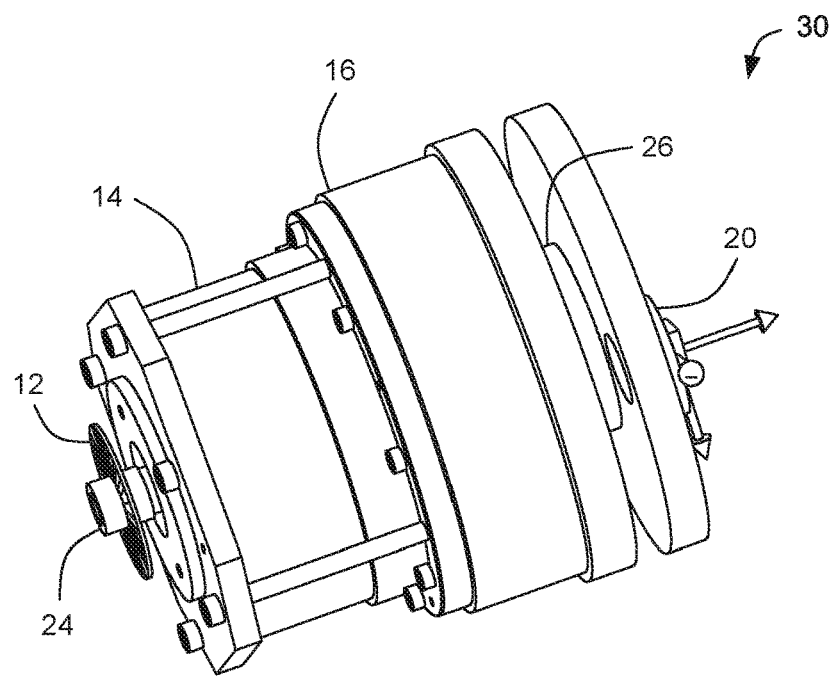
FIG. 2 is a perspective view of an example embodiment of a rotary positioning system, implemented according to aspects of the present technique.
Figure 3:
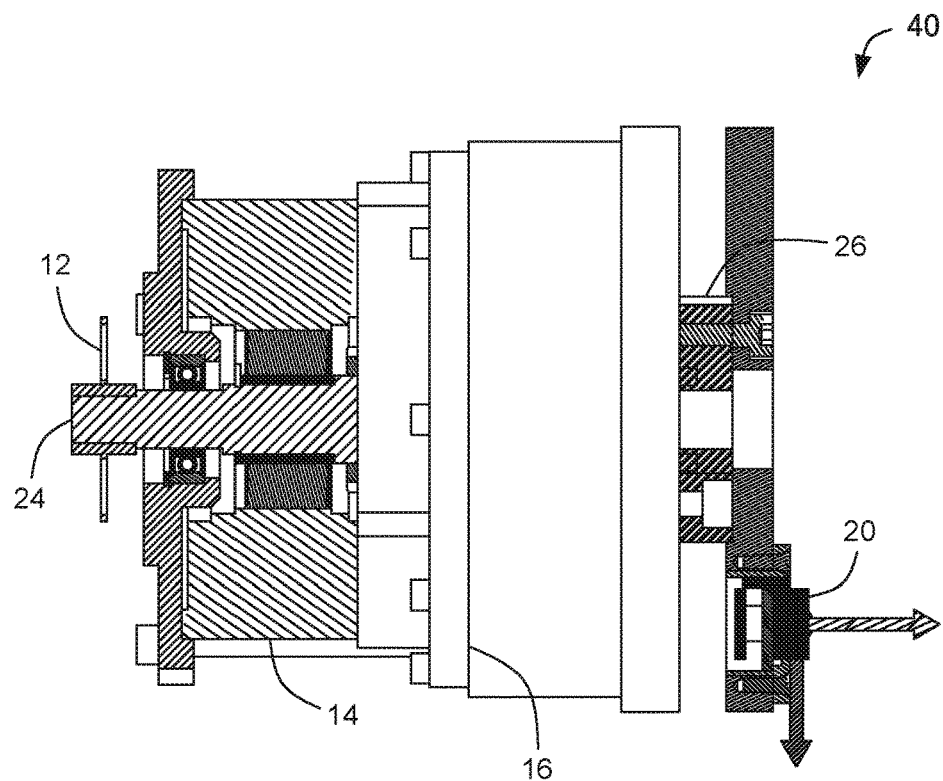
FIG. 3 is a cross sectional view of a rotary positioning system, implemented according to aspects of the present technique.
Figure 4:
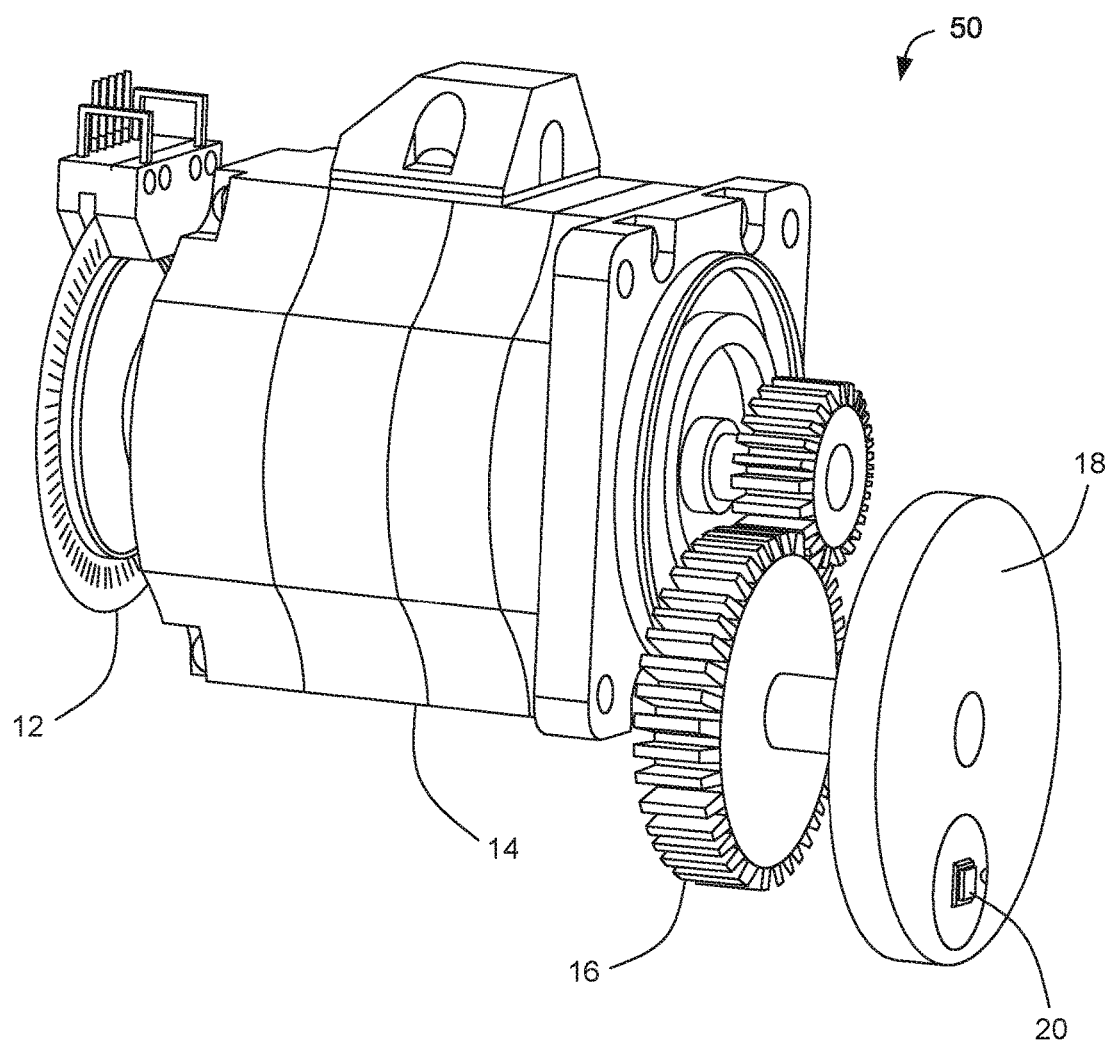
FIG. 4 is an exploded view of a rotary positioning system, implemented according to aspects of the present technique.

FIG. 2, FIG. 3 and FIG. 4 illustrate a perspective view 30, a cross sectional view 40 and an exploded view 50 respectively of an example embodiment of a rotary positioning system 10, implemented according to aspects of the present technique. The rotary positioning system 10 described above may be utilized for detecting the position of a moving mechanism such as, but not limited to, for driving an arm-driven type or a stage-driven type of industrial robot. The invention basically includes a fundamental structure comprising a motor shaft 24 coupled to a motor 14. The motor shaft 24 is further coupled to an output drive shaft 26 via a speed reducer 16. As explained earlier, a sensor 20 is mounted on the output drive shaft 26 to determine an absolute orientation of the output drive shaft 26 for every index pulse generated.

Here, input rotary motion is translated through the speed reducer 16 to provide rotary motion at the output drive shaft 26. While the present invention is explained relative to rotary positioning system of this nature, the principle of the method of this invention can also be applied to any situation requiring measurement of motion of a moving mechanism via an absolute/incremental encoder connected to the moving mechanism through a speed reducer, as well as to detect a given position, such as an angular position or a linear position.

In operation, the controller 22 initiates rotary motion (in the same direction that was used in the calibration process) and on sensing a Z channel index pulse the controller 22 records the sensor data. The controller 22 uses this sensor data and the correlation function to identify the absolute count of the index pulse sensed. In this embodiment, the absolute angular position of the motor shaft 24 at this index pulse is given by the product of the absolute index pulse count and the resolution of the encoder 12. Since an index pulse occurs for every single full rotation of the motor shaft 24, mastering is completed within the motion of the output drive shaft 26 which corresponds to at most one rotation of the motor shaft 24.

For example, consider a rotary positioning unit that uses a 120:1 ratio speed reducer. In this example embodiment, when the motor shaft 24 rotates through one full rotation of 360 degrees the outputs drive shaft 26 rotates through 3 deg. Thus, mastering is completed by rotating the output drive shaft 26 by 3 degrees only whereas in conventional mastering the output drive shaft 26 has to be rotated all the way to its range limit sensor. In this example embodiment, the resolution of the sensor needs to be equal to or greater than the speed reducer ratio. Thus, a 120:1 ratio requires a 7-bit ($2^7=128$) resolution sensor. Generally, sensors provide resolutions starting at 8 bits and all the way to 12 bits (and often 16 bits). This indicates the speed reducer ratios up to 4000:1 can easily be supported.

Thus, the above described rotary positioning system provides the advantage of mastering within the motion of the output drive shaft which corresponds to at most one rotation of the motor shaft which in turn eliminates the need of rotating the output drive shaft to an electronic limit switch at one end of its motion range. Further, this invention provides substantial reduction in costs by eliminating the use of high resolution absolute encoders at the output drive shaft or multi-turn absolute encoders at the input motor shaft.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated and described herein, many modifications and changes will occur to those skilled in the art. It is, therefore, to be understood that the appended claims are intended to cover all such modifications and changes as fall within the true spirit of the invention.

The invention claimed is:

1. A rotary positioning system configured to provide absolute positional referencing, the rotary positioning system comprising:
   an encoder mounted on a motor shaft of a motor and configured to generate an index pulse corresponding to a complete rotation of the motor shaft;
   a speed reducer coupled to the motor shaft and configured to reduce a rotary motion of the motor by a pre-defined ratio;
   an output drive shaft coupled to the speed reducer and configured to transfer the reduced rotary motion to a load;
   a sensor mounted on the output drive shaft of the speed reducer and configured to determine an absolute rotational orientation of the output drive shaft; and
   a controller coupled to the sensor and configured to generate a correlation function of the absolute rotational orientation and an index pulse count, the index pulse count being a count of the generated index pulses, wherein
   the correlation function provides the absolute positional referencing of the motor shaft based on the pre-defined ratio of the speed reducer, and
   the sensor is configured to perform a one-time calibration by referencing the absolute rotational orientation from the sensor to the occurrence of the index pulses.

2. The system of claim 1, wherein the controller is further configured to determine the index pulse count corresponding to the absolute rotational orientation by using the correlation function and to pre-load a position counter with a corresponding joint angle value from the correlation function.

3. The system of claim 1, wherein the sensor is further configured to determine an absolute rotational orientation of the output drive shaft using a combination of acceleration, angular velocity and magnetic field.

4. The system of claim 1, wherein the encoder is configured to operate on absolute values or incremental values.

5. The system of claim 1, wherein the sensor comprises a motion sensor or an orientation sensor.

6. The system of claim 1, wherein the one-time calibration is performed by rotating the output drive shaft from a pre-defined range limit towards an opposite pre-defined range limit marked by a limit switch.

7. The system of claim 1, wherein the controller further comprises a non-volatile memory configured to store the correlation function based on an absolute rotational orientation angle and the index pulse count.

8. The system of claim 1, wherein the pre-defined ratio of the speed reducer is based on a resolution of the sensor.

9. The system of claim 8, wherein the pre-defined ratio of the speed reducer is a desired ratio that is less than or equal to the resolution of the sensor.

10. A method for providing absolute positional referencing using a rotary positioning system, the method comprising:
    generating an index pulse corresponding to a complete rotation of a motor shaft of a motor using an encoder mounted on the motor shaft;
    reducing a rotary motion of the motor by a pre-defined ratio using a speed reducer coupled to the motor shaft;
    transferring the reduced rotary motion to a load using an output drive shaft coupled to the speed reducer;
    determining an absolute rotational orientation of the output drive shaft using a sensor mounted on the output drive shaft of the speed reducer;

generating a correlation function of the absolute rotational orientation and an index pulse count using a controller coupled to the sensor, the index pulse count being a count of the generated index pulses, wherein the correlation function provides the absolute positional referencing of the motor shaft based on the pre-defined ratio of the speed reducer; and performing a one-time calibration on the sensor by referencing the absolute rotational orientation from the sensor to the occurrence of the index pulses.

11. The method of claim 10, further comprising:
determining the index pulse count corresponding to the absolute rotational orientation by using the correlation function using the controller; and
loading a position counter with a corresponding joint angle value from the correlation function using the controller.

12. The method of claim 10, further comprising:
determining an absolute rotational orientation of the output drive shaft based on a combination of acceleration, angular velocity, and magnetic field, using the sensor.

13. The method of claim 10, further comprising:
operating the encoder on absolute values or incremental values.

14. The method of claim 10, wherein the sensor comprises a motion sensor or an orientation sensor.

15. The method of claim 10, wherein the one-time calibration is performed by rotating the output drive shaft from a pre-defined range limit towards an opposite pre-defined range limit marked by a limit switch.

16. The method of claim 10, further comprising:
storing the correlation function based on an absolute rotational orientation angle and the index pulse count in a non-volatile memory included in the controller.

17. The method of claim 10, wherein the pre-defined ratio of the speed reducer is based on a resolution of the sensor.

18. The method of claim 17, wherein the pre-defined ratio of the speed reducer is a desired ratio that is less than or equal to the resolution of the sensor.

* * * * *